United States Patent [19]

Shimano

[11] 4,445,397
[45] May 1, 1984

[54] FOOT CONFORMING PEDAL FOR A BICYCLE

[75] Inventor: Keizo Shimano, Sakai, Japan

[73] Assignee: Shimano Industrial Company Limited, Osaka, Japan

[21] Appl. No.: 293,093

[22] Filed: Aug. 17, 1981

[30] Foreign Application Priority Data

| Aug. 25, 1980 | [JP] | Japan | 55-121009[U] |
| Aug. 25, 1980 | [JP] | Japan | 55-121010[U] |
| Aug. 25, 1980 | [JP] | Japan | 55-121011[U] |
| Sep. 19, 1980 | [JP] | Japan | 55-134346[U] |

[51] Int. Cl.$^3$ ............................................. G05G 1/14
[52] U.S. Cl. ................................... 74/560; 74/594.4; 74/594.5; 74/594.6
[58] Field of Search ............... 74/560, 594.4, 594.5, 74/594.6; 182/228, 222

[56] References Cited

U.S. PATENT DOCUMENTS

| 614,900 | 11/1898 | Seaver et al. | 74/594.5 |
| 2,104,303 | 1/1938 | Howard | 182/222 |
| 3,791,485 | 2/1974 | Norlander | 182/228 X |
| 4,335,628 | 6/1982 | Shimano | 74/560 X |

FOREIGN PATENT DOCUMENTS

| 867761 | 11/1941 | France | 74/594.4 |
| 898926 | 5/1945 | France | 74/594.4 |
| 576951 | 4/1946 | United Kingdom | 74/594.4 |

Primary Examiner—Allen D. Herrmann
Assistant Examiner—Frank McKenzie
Attorney, Agent, or Firm—Stevens, Davis, Miller & Mosher

[57] ABSTRACT

A pedal for a bicycle, which comprises a pedal shaft and a pedal body, the pedal body having a first foot bearing body which is formed in a frame-like shape and has a front foot bearing surface and a rear foot bearing surface, and a second foot bearing body having a middle foot bearing surface, the front foot bearing surface being formed in an arch matching with the toe arrangement at a cyclist's foot, and the middle foot bearing surface being formed in an arch matching with the line of all balls at his foot from the root of the big toe to the root of the little toe.

6 Claims, 11 Drawing Figures

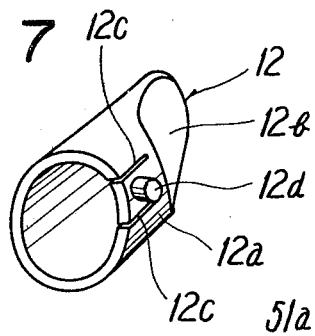
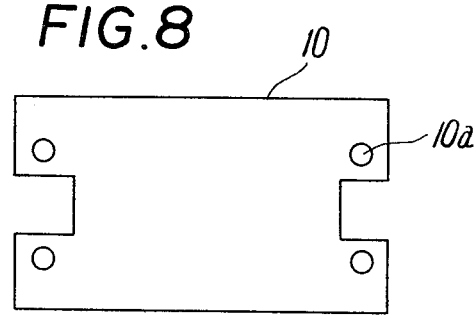
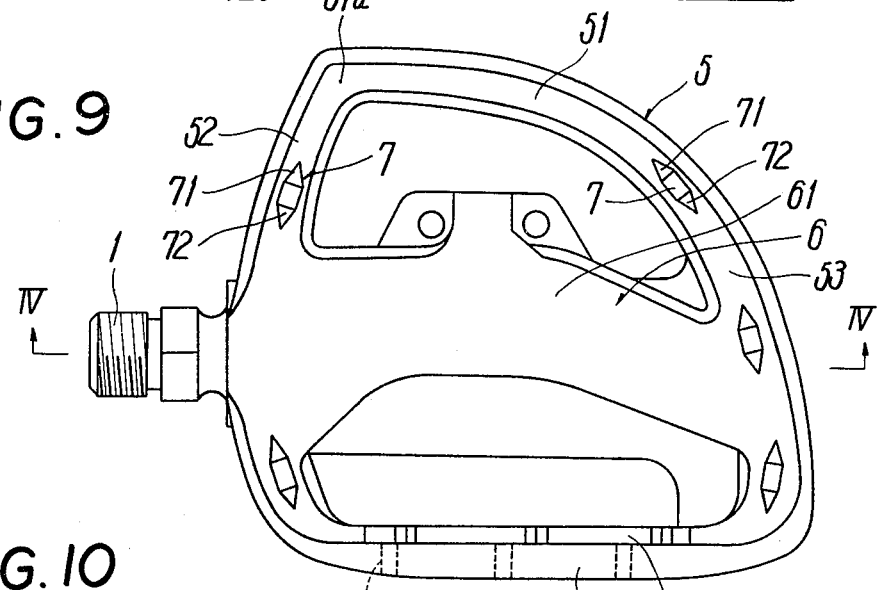
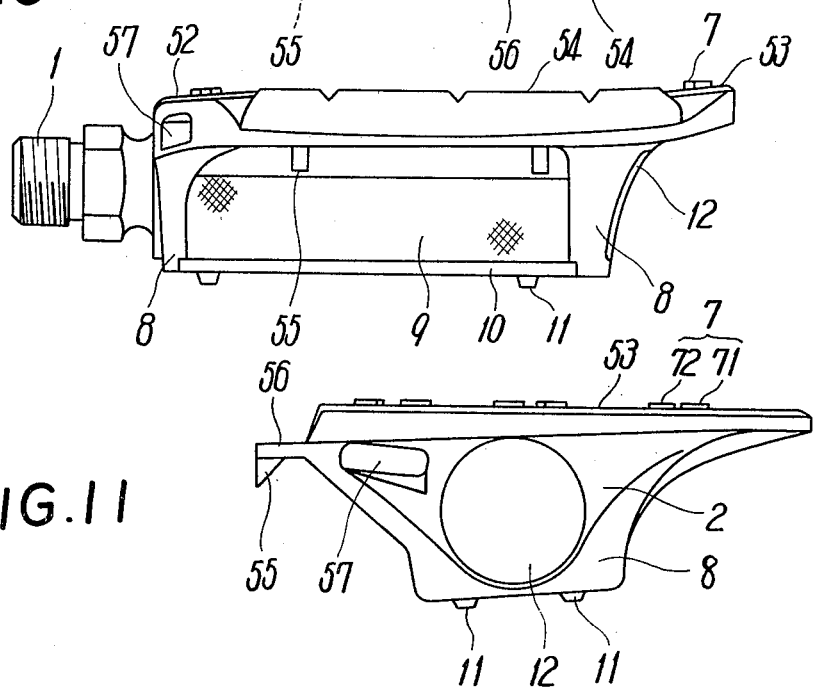

FOOT CONFORMING PEDAL FOR A BICYCLE

FIELD OF THE INVENTION

This invention relates to a pedal, and more particularly to a pedal which is mounted on the utmost end of a crank arm for a bicycle.

BACKGROUND OF THE INVENTION

Generally, a pedal for a bicycle comprises a pedal shaft fixed to a crank arm and a pedal body supported rotatably to the pedal shaft, the pedal body carrying front and rear foot bearing plates through inner and outer plates so that a cyclist pedals the bicycle through the foot bearing surfaces at both the front and rear plates.

The conventional pedal has narrow foot bearing surfaces which are parallel to the axis of the pedal shaft. When the cyclist places his foot on the foot bearing surface of the front plate for pedaling, the root of his big toe (near the sesamoid), is positioned on the surface but the roots of other toes are not because the roots of all the toes are disposed in an arch, so that his treading force is transmitted to the pedal collectively through the root of the big toe. This creates a problem in that a cyclist, especially when pedaling the bicycle against a heavy load such as in a cycling race or on an upward slope, will be fatigued in a short time. Even when he shifts his foot on the foot bearing surface longitudinally of the pedal, the same problem as the above occurs. In either case, it is impossible to fit the roots of all the toes to the foot bearing surface and transmit the distributed treading force to the pedal.

In order to overcome the above problem, a pedal has been proposed having a flat type foot bearing body. This pedal, however, has an increased weight and is expensive to produce, and therefore does not provide a fundamental solution for the problem.

SUMMARY OF THE INVENTION

In the light of the above problem, this invention has been designed. An object of the invention is to provide a pedal for a bicycle, which is lightweight and permits a cyclist to be less fatigued with driving the bicycle for a long time.

The pedal of the invention is characterized in that a front foot bearing surface on a pedal body is formed in an arch about similar to the line connecting the tips of the cyclist's toes, and a middle foot bearing surface is formed in an arch about similar to the line connecting the balls of his foot from the roots of the big toe through the little toe.

In detail, the pedal body of the pedal of the invention comprises; a first foot bearing body of a frame-like shape comprising the front foot bearing surface, a rear foot bearing surface positioned rearwardly thereof, and right-hand and left-hand foot bearing surfaces; and a second foot bearing body having a middle foot bearing surface positioned at an intermediate portion between the front and rear foot bearing surfaces and in continuation of the right-hand and left-hand foot bearing surfaces, the front and middle foot bearing surfaces being arcuate, so that all the toes and the roots of a cyclist's foot can be placed throughout on the foot bearing surfaces. As a result, the cyclist is less fatigued when pedaling because the treading force is transmitted effectively to the pedal body from all his toes and the roots thereof.

The pedal of the invention fits the front foot bearing surface to the roots of the cyclist's toes enabling him to be less fatigued to transmit the treading force to the pedal. Hence, he can distribute the treading force at the root of each toe to transmit it to the pedal body, thereby being less fatigued even during a long drive of the bicycle.

All the toes, when the roots thereof are placed on the middle foot bearing surface, can be supported on the front foot bearing surface, so that the cyclist can pedal the bicycle stably and tirelessly without forcibly bending his foot even when he is pedaling against a heavy load during racing or when pedaling on an upward slope.

Furthermore, with the pedal of the invention, even if the cyclist shifts his foot longitudinally of the pedal to place the plantar arc in the vicinity of the rear foot bearing surface, all the roots of his toes can be kept on the front foot bearing surface, whereby the arcuate surface thereof fits the roots to enable him to drive the bicycle tirelessly for a long time.

These and other objects of the invention will become more apparent in the detailed description and examples which follow.

BRIEF DESCRIPTION OF THE INVENTION

Figure 1:
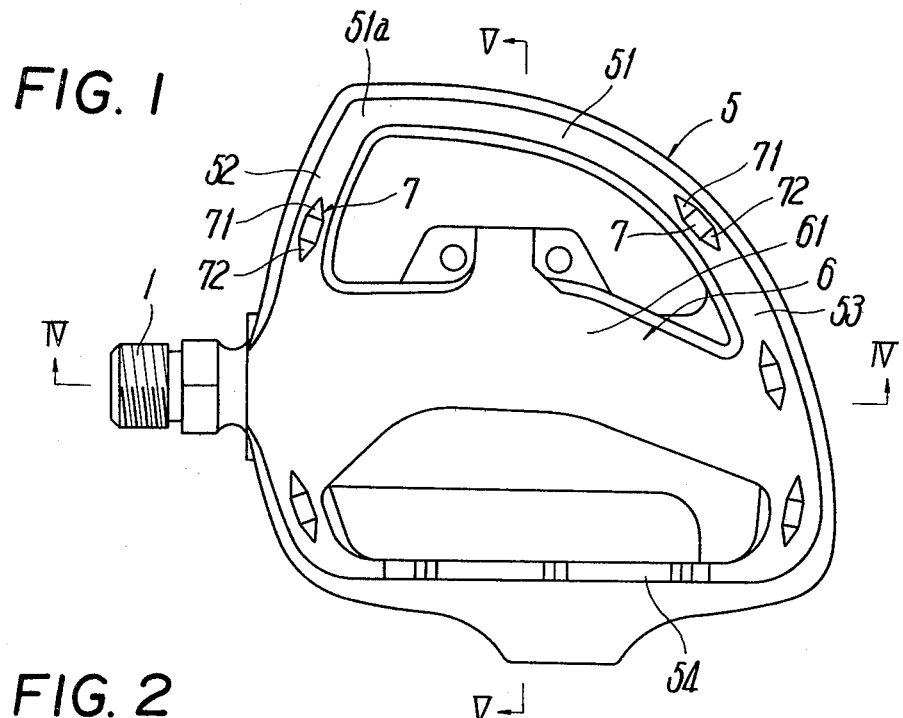
FIG. 1 is a plan view of an embodiment of a pedal of the invention.
Figure 2:
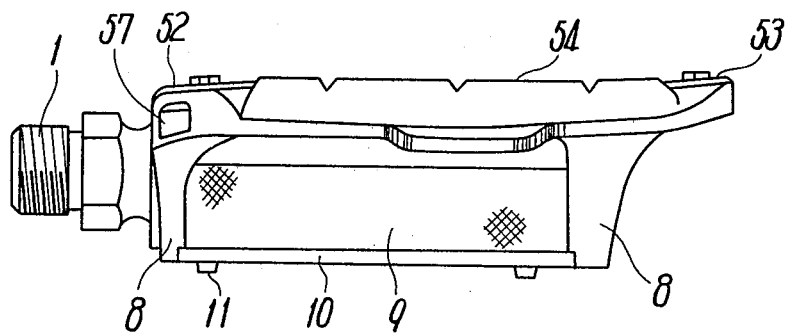
FIG. 2 is a rear view of the pedal in FIG. 1.
Figure 3:
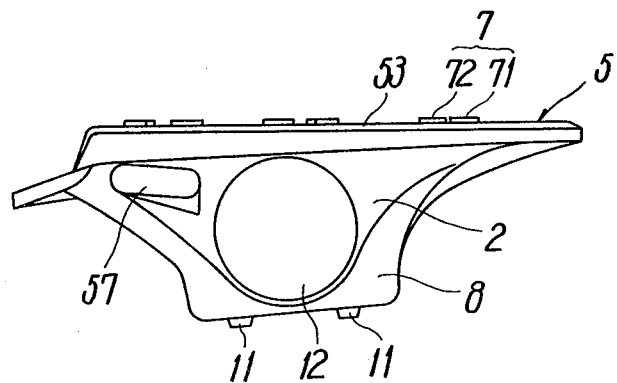
FIG. 3 is a right side view of the FIG. 1 embodiment.
Figure 6:
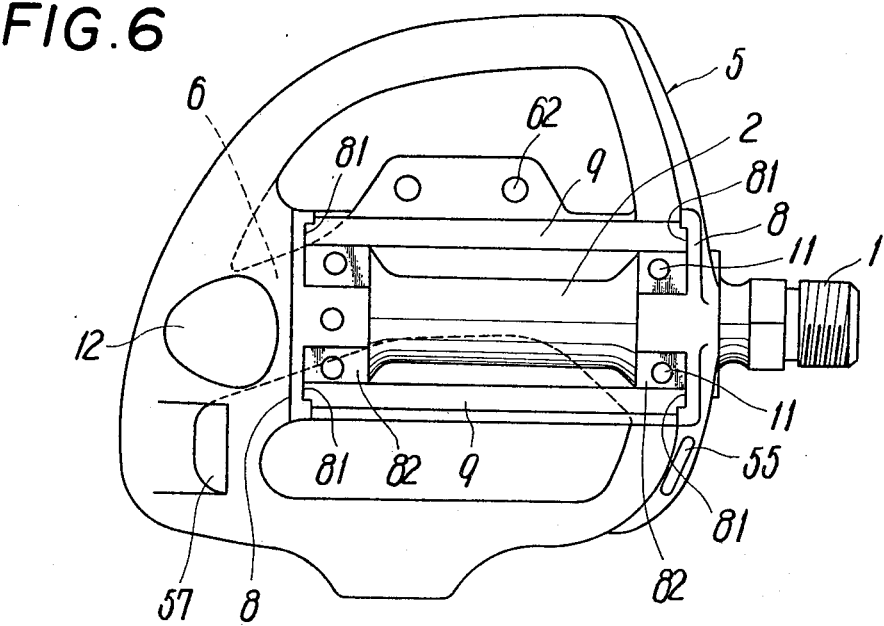

FIG. 6 is a rear view of the FIG. 1 embodiment, from which a cover plate is removed, FIG. 7 is a perspective view of an example of a cap, FIG. 8 is a plan view of the cover plate only, FIGS. 9 through 11 showing a modified embodiment of the invention, in which FIG. 9 is a plan view of the modified embodiment, FIG. 10 is a rear view thereof, and FIG. 11 is a right side view of the FIG. 9 embodiment.

DETAILED DESCRIPTION OF THE INVENTION

Referring to the drawings reference numeral 1 designates a pedal shaft, and 2 designates a pedal body supported rotatably to the pedal shaft 1 through a pair of ball bearings 3 and 4, the pedal body 2 being cylindrical and having a first foot bearing body 5 of a frame-like shape, which is provided at a radially upper side of the pedal body 2, at a position displaced from the pedal shaft 1 radially upwardly thereof.

The first foot bearing body 5 has a front foot bearing surface 51 of a given width (of about 10 mm), left-hand and right-hand foot bearing surfaces 52 and 53 in continuation of the front bearing surface 51, and a rear foot bearing surface 54 in continuation of the left-hand and right-hand foot bearing surfaces 52 and 53. The front foot bearing surface 51 is formed in an arch corresponding to a curve from the big toe to the little toe of a cyclist't foot, the arch extending gradually rearwardly from a big toe bearing surface 51a at the foremost end of the front foot bearing surface 51 and being in continuation of the left-hand and right-hand foot bearing surfaces 52 and 53.

The right-hand pedal is shown, in which the big toe bearing surface 51a is bending from the left side thereof in a small curvature and in continuation of the left-hand foot bearing surface 52, and curving from the right side in an arch and in continuation of the right-hand foot bearing surface 53.

The rear foot bearing surface 54, as shown in the drawing, is linear about in parallel to the axis of pedal shaft 1 and is smaller in width (of about 3 mm) than the respective foot bearing surfaces 51 through 53, thereby being engageable with grooves at a shoe plate at a racer's shoe.

The first foot bearing body 5 is provided at a longitudinally intermediate portion thereof with a second foot bearing body 6 having a middle foot bearing surface 61 of a large width (of about 15 to 20 mm) and in an arch extending from the root of the cyclist's big toe, near the sesamoid, to the root of the little toe.

The second foot bearing body 6 extends along the pedal body 2 and is integral therewith, and the middle foot bearing surface 61 connects at both lengthwise ends with the left-hand and right-hand foot bearing surfaces 52 and 53.

Figure 5:
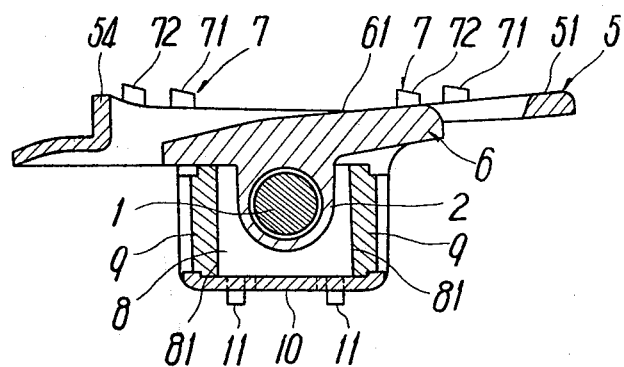

The middle foot bearing surface 61 at the second foot bearing body 6 may be in continuation coplanarly of the left-hand and right-hand foot bearing surfaces 52 and 53. Alternatively, the surface 61 may be stepped to be shifted toward the axis of pedal shaft 1. In this instance, the cyclist can drive the bicycle against a light load by keeping the roots of all his toes raised from the surface 61, but, when driving against a heavy load, the cyclist can contact the roots of the toe with the surface 61 in a sinking manner with respect to the left-hand and right-hand surfaces 52 and 53, thereby keeping his foot from shifting laterally, thus improving a stable steerability of the bicycle.

Where the middle foot bearing surface 61 is made coplanar with the left-hand and right-hand surfaces 52 and 53, it is preferable that the respective foot bearing surfaces 51 through 54 at the first foot bearing body 5, as shown in FIG. 5, are curved downwardly around the axis parallel to the axis of pedal shaft 1, and the middle foot bearing surface 61 is displaced toward the axis of pedal shaft 1 with respect to the front and rear foot bearing surfaces 51 and 54.

As a result, the cyclist's toes and the roots thereof are fitted naturally to the front and middle foot bearing surfaces 51 and 61, whereby he can transmit the treading force in his natural posture from the foot bearing bodies 5 and 6 to the pedal body 2.

Figure 4:
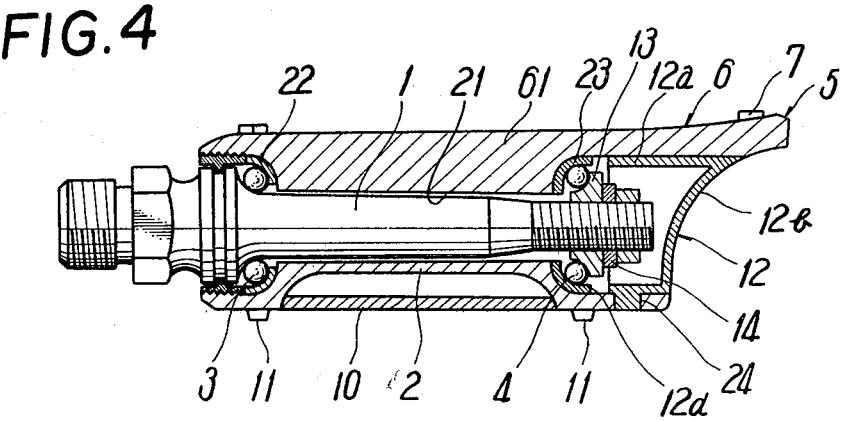
FIGS. 4 and 5 are sectional views taken on the lines IV—IV and V—V in FIG. 1.

The pedal body 2 and first and second foot bearing bodies 5 and 6 are made from, e.g., aluminum, and are integrally molded by die casting, the pedal body 2, as shown in FIG. 4, being provided at the axial center with a through bore 21 through which the pedal shaft 1 passes. The bore 21 has at both axial ends thereof larger diameter portions and carries at the shoulders thereof cups 22 and 23 for receiving the bearings 3 and 4 respectively. A cap 12 is mounted on an axially open end of the bore 21.

The cap 12, as shown in FIG. 7, comprises a shaft bore fitting tube 12a and a closer 12b for closing one end of the tube 12a, and is formed of synthetic resin. The fitting tube 12a has a pair of slits 12c extending lengthwise of the same, is made elastically deformable between the slits 12c, and has therebetween a projection 12d projecting radially outwardly from the tube 12a and integral therewith, the projection 12d being displaced radially inwardly of the tube 12a through the elastically deformation between the slits 12c.

The projection 12d is fitted into a through bore 24 formed at the pedal body 2 as shown in FIG. 4, thereby reliably fixing the cap 12 to the open end of the shaft bore 21. While, the projection 12d is pushed from the outside into the fitting tube 12a to draw out the cap 12.

Therefore, the cap 12 is held in position without rotation and escape, so that the closer 12b, when displaying thereon letters or the like, can keep them in a proper position.

The projection 12d may alternatively be separate from the cap 12, or an elastic plate having the projection 12d may be mounted on the fitting tube 12a. The cap 12, when formed of soft synthetic resin, need not have the slits 12c.

Furthermore, the pedal body 2, as shown in FIGS. 5 and 6, is provided at both lengthwise ends with support walls 8 projecting from the reverse sides of the foot bearing surfaces at the pedal body 2, the support walls 8 having grooves 81, in which plate-like shaped reflectors 9, as shown in FIG. 5, are supported and disposed at both sides of pedal body 2 longitudinally thereof respectively.

The support walls 8, as shown in FIG. 6, are provided at the insides thereof with holders 82 for a cover plate 10 used to lock the reflectors 9, the holders 82 having pins 11 projecting therefrom, the cover plate 10 having through-bores 10a as shown in FIG. 8 and being placed on the holders 82, so that the pins 11 are inserted into the through-bore 10a to be caulked, thereby fixing the reflectors 9 to the pedal body 2 respectively.

Alternatively, one reflector 9 may be provided preferably rearwardly of the pedal body 2. The cover plate 10 is made from a metal larger in specific gravity than an aluminum alloy, thereby being used also as a balancing weight to allow the respective foot bearing surfaces to face upwardly. The pins 11, when projecting outwardly from the cover plate 10, serve as antiskid members to prevent the cyclist's foot from slipping if he carelessly treads the cover plate 10.

The left-hand and right-hand foot bearing surfaces 52 and 53 at the first foot bearing body 5, as shown in FIG. 1, have spikes 7 formed integrally with the surfaces 52 and 53 or embedded therein. The spikes 7 each comprise a pair of triangular projections 71 and 72, two spikes 7 being provided at the left-hand foot bearing surface 52 and three at the right-hand foot bearing surface 53. The spikes 7 at left-hand foot bearing surface 52 each have the rear side the projection 72 lower than the front side projection 71, so that the cyclist can slip his foot rearwardly but not forwardly. The spikes 7 at the right-hand foot bearing surface 53 each have projections 71 and 72 which are slanted leftwardly upwardly at the upper surfaces, so that the cyclist can slip his foot axially inwardly of the pedal shaft 1 but not axially outwardly thereof.

The spikes 7, as abovementioned, are provided at the left-hand and right-hand foot bearing surfaces 52 and 53, to prevent a cyclist's foot from slipping in an undesired direction and hold it in position, to thereby further minimize a cyclist's fatigue with pedalling and improving driving stability.

The rear foot bearing surface 54 of the first foot bearing body 5, as shown in FIGS. 9 through 11, may be provided at the reverse side with pawls 55 extending away from the rear foot bearing surface 54. In this case, each pawl 55 has a sharp tip engageable with the sole of cyclist's foot to thereby make it possible to turn over the pedal body 2. In the embodiment shown in FIGS. 9 through 11, at the reverse side of the rear foot bearing surface 54 is provided a projection 56 which has at the lower surface thereof and at the rear end three triangular pawls 55 projecting downwardly.

In case that the pedal body 2 is turned over by angle of 180° when the cyclist intends to place his foot on the pedal, he catches the pawls 55 by his tip toes and shifts his foot forwardly in the direction of driving the bicycle, thereby easily turning over the pedal body 2 to a normal driving position.

In addition, in the drawings, reference numeral 13 designates a ball holder screwed with the pedal shaft 1, 14 designates a lock nut for fixing the ball holder 13, 57 designates an insertion bore for a toe clip, at the rear portion of the first foot bearing body 5, and 62 designates an insertion bore for a toe strap at the front portion of the second foot bearing body 6.

The foregoing disclosure is for the purpose of disclosing a specific preferred embodiment and the scope of this invention is of course not limited to the specific construction, but only as defined in the following claims.

What is claimed is:

1. A pedal for a bicycle comprising a pedal shaft and a pedal body supported rotatable to said pedal shaft and having a shaft bore, said pedal body comprising a first foot bearing body having a frame-like shape and a front foot bearing surface, a rear foot bearing surface, and left-hand and right-hand foot bearing surfaces, said left-hand and right-hand foot bearing surfaces being curved around axes which are parallel to an axis of said pedal shaft; and a second foot bearing body having a middle foot bearing surface positioned at a longitudinally intermediate portion between said front foot bearing surface and said rear foot bearing surface and in continuation of said left-hand and right-hand foot bearing surfaces, said middle foot bearing surface being displaced toward the axis of said pedal shaft with respect to said front and rear foot bearing surfaces; said first and second foot bearing bodies being displaced radially upwardly on one side of the axis of said pedal shaft, said pedal body having a pair of support walls at opposite lateral sides of each of the first and second foot bearing bodies, and reflectors located between said support walls.

2. A pedal for a bicycle according to claim 1, wherein said support walls are disposed in proximity to the central portion in the longitudinal direction of said pedal body, said support walls each carrying a cover plate at the utmost end in the extending direction of the same.

3. A pedal for a bicycle according to claim 2, wherein said cover plate has antiskid projections.

4. A pedal for a bicycle according to claim 1, wherein said pedal body has a cap at an open end of said shaft bore, said cap comprising a fitting tube to fit into said shaft bore and a closer portion, said fitting tube having at the outer surface thereof a projection projecting outwardly, said pedal body having a retaining bore perforating said shaft bore from the outer surface thereof, so that said projection is fitted into said retaining bore to fix said cap to said pedal body.

5. A pedal for a bicycle according to claim 1, wherein said first foot bearing body at said pedal body has at the reverse side of said rear foot bearing surface pawls extending away from said rear foot bearing surface, each of said pawls being sharp at the utmost end thereof.

6. A pedal for a bicycle according to claim 1, wherein spikes are provided on said left-hand and right-hand foot bearing surfaces and the spikes on one of said left-hand and right-hand foot bearing surfaces have a rear side projection and a front side projection, the rear side projection being lower than the front side projection, and the spikes on the other of said left-hand and right-hand foot bearing surfaces have front side and rear side projections which slant upwardly and inwardly of said pedal body.

* * * * *